United States Patent [19]

Gozdz et al.

[11] Patent Number: 5,554,459
[45] Date of Patent: Sep. 10, 1996

[54] MATERIAL AND METHOD FOR LOW INTERNAL RESISTANCE LI-ION BATTERY

[75] Inventors: Antoni S. Gozdz, Tinton Falls; Paul C. Warren, Far Hills, both of N.J.

[73] Assignee: Bell Communications Research, Inc., Morristown, N.J.

[21] Appl. No.: 589,944

[22] Filed: Jan. 23, 1996

[51] Int. Cl.⁶ ................................................. H01M 4/64
[52] U.S. Cl. ...................... 429/194; 429/241; 429/245; 29/623.5
[58] Field of Search .................................. 429/234, 241, 429/233, 245, 209, 194; 29/623.1, 623.5

[56] References Cited

U.S. PATENT DOCUMENTS

| | | | |
|---|---|---|---|
| 4,161,569 | 7/1979 | Faber | 429/234 |
| 4,215,190 | 7/1980 | Ferrando et al. | 429/241 X |
| 4,581,307 | 4/1986 | Jumel | 429/194 |
| 4,585,715 | 4/1986 | Marple | 429/194 |

*Primary Examiner*—Anthony Skapars
*Attorney, Agent, or Firm*—Leonard Charles Suchyta; Lionel N. White

[57] ABSTRACT

An electrically-conductive collector element (23) in a polymeric laminate lithium ion rechargeable battery is cleaned of surface oxides and coated with an adherent conductive polymer film (34) which is substantially inert to battery electrolyte components and prevents recurrent formation of insulative collector surface oxides, thereby maintaining effective electrode/collector electrical conductivity and significantly reducing internal battery resistance.

18 Claims, 4 Drawing Sheets

MATERIAL AND METHOD FOR LOW INTERNAL RESISTANCE LI-ION BATTERY

BACKGROUND OF THE INVENTION

The present invention relates to secondary, rechargeable batteries, particularly such batteries which are constructed of layered, polymeric composition electrode and electrolyte elements laminated with electrically-conductive collector members, typically metallic foils. More particularly, the invention relates to such batteries comprising reticulate collector foils and provides a means for reducing the internal electrical resistance factor of such batteries which may, in part, be attributable to insulating metallic oxides formed on the surface of such collector foils, as well as the insulating effect of electrolyte solution wetting the electrode/collector foil interface.

Typical laminated polymeric composition battery structures with which the present invention is useful are described, for example, in U.S. Pat. Nos. 5,460,904 and 5,478,668. Such a battery comprises respective positive and negative polymeric matrix electrode composition layers of lithium intercalation compound and carbon which are laminated together and to metal foil current collector elements that provide the primary terminals for electrical connections.

As is known in the industry, the individual electrical resistance of each member of a battery structure contributes to an overall internal battery resistance which represents a nonproductive load and energy drain in any utilization circuit, particularly one which includes an external low impedance device. The power dissipated in overcoming such internal resistance not only detracts directly from the efficiency of a battery, it may further generate within the battery a level of heat which has a deleterious effect on not only the operation of the battery, but also on the integrity of the battery members, viz., the electrodes and electrolyte. Such effects are particularly felt by polymeric members of the noted laminated lithium ion rechargeable batteries.

A significant source of electrical resistance has been observed in the oxide which readily forms on the surface of the current collector foils, particularly aluminum, preferably employed with the polymer matrix lithium intercalation compound and carbon electrode compositions of battery cells such as described in the above-noted patents. Also contributing to the resistance in these cells has been the introduction of activating electrolyte solution which results in a swelling and expansion of the electrode members and intrusion of the solution between the electrode and collector surfaces, thereby interfering with the firm physical contact which ensures good electrical conductivity through these members.

The present invention provides an effective means of substantially eliminating the formation of insulating metal oxides on the collector elements, as well as of maintaining the integrity of a strong physical, electrically-conductive bond between the electrode and collector members, and thereby dramatically reducing the internal resistance of the Li-ion intercalation battery cells which are gaining favor in the industry.

SUMMARY OF THE INVENTION

In the implementation of the present invention, metal collector elements, typically of copper and aluminum foil and preferably in the form of open-mesh grids, are surface-treated with solvent and etching solution to remove processing oils and metallic oxides formed during manufacture. Thereafter, the collector foil surfaces are coated with a protective, metal-adherent, non-swelling polymeric composition comprising a homogeneously dispersed electrically-conductive material, such as carbon black, which serves to maintain the electrical conductivity between the coated collector member and its associated polymer-based electrode.

The polymer of the coating composition may be any material which is substantially insoluble in and preferably not wetted or swollen by the solvents, such as ethers, esters, or alcohols, used to extract the plasticizer, e.g., DBP, from the battery cell electrode and separator members, and the lithium salt solvents, such as the cyclic and acyclic carbonates, comprising activating electrolyte solutions. Polyolefin-based compositions, such as poly (ethylene-co-acrylic acid) copolymers serve well in this role. Such a selected polymer matrix not only provides a strongly-adherent protective film which deters subsequent oxidation, but also resists degradation of conductive continuity upon contact by subsequently-applied processing solvents and electrolyte solutions.

BRIEF DESCRIPTION OF THE DRAWING

The present invention will be described with reference to the accompanying drawing of which.

DESCRIPTION OF THE INVENTION

Figure 1:
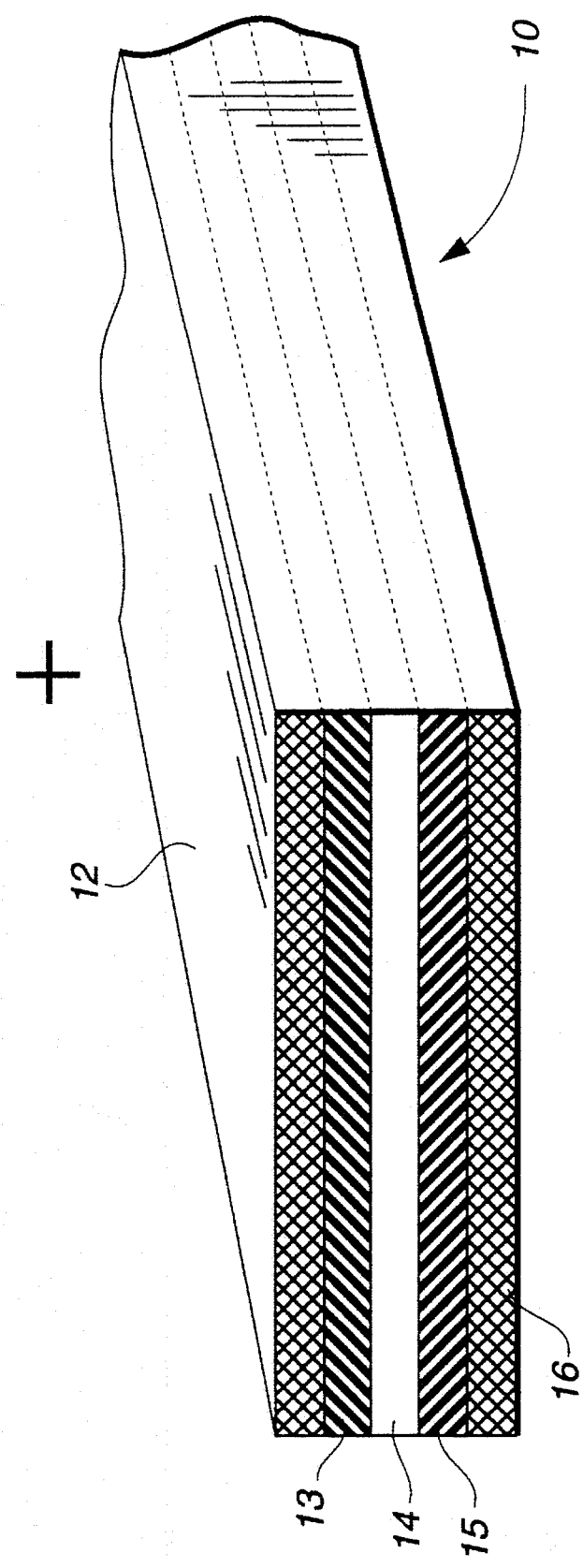
FIG. 1 is a perspective view of a representative section of a typical polymeric laminated battery structure.

The structure of a representative polymer-based Li-ion battery may be seen in the model of FIG. 1 as comprising a unitary laminate of a positive electrode composition layer 13 with its associated current collector member 12, an intermediate separator/electrolyte layer 14, and a negative electrode composition layer 15 with its associated current collector member 16. When initially assembled for lamination, the structure components typically include: as electrode 13, a 300 µm thick film of 56 parts by weight of a $LiMn_2O_4$ intercalation compound and 6 parts of carbon black intimately dispersed in a binder matrix of 16 parts of an 88:12 vinylidene fluoride:hexafluoropropylene (PVdF:HFP) copolymer plasticized with 16 parts of dibutylphthalate (DBP); as separator 14, an 85 µm thick film of 20 parts of colloidal silica intimately dispersed in 30 parts of the copolymer plasticized with 50 parts of DBP; and as electrode 15, a 200 µm thick film of 56 parts of microbead coke and 3 parts of carbon black intimately dispersed in 15 parts of the copolymer plasticized with 23 parts of DBP.

Since, as described in the above-noted patents, the post-lamination processing of the battery structure will include a solvent extraction of the DBP plasticizer from the polymer matrices, one or both, as depicted in FIG. 1, of copper collector foil 16 and aluminum collector foil 12 may be reticulate, for example in the form of a 50 µm thick expanded metal grid, such as the MicroGrid precision foil marketed by Delker Corporation, in order to provide suitable pathways for solvent penetration.

Figure 2:
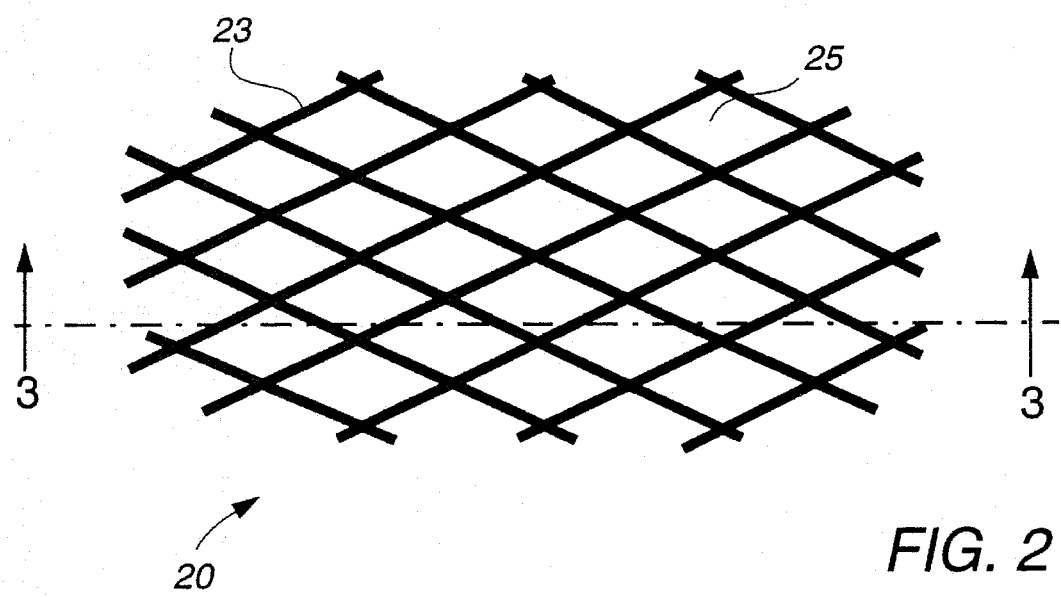
FIG. 2 is a plan view of a section of a current collector grid member used in the battery structure of FIG. 1.
Figure 3:
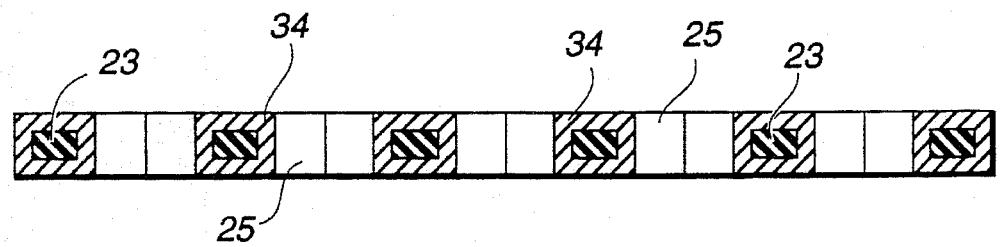
FIG. 3 is a cut-away elevational view of the current collector member section of FIG. 2 taken along line 4—4 showing the protective collector coating of the present invention.

In representative examples of a preferred embodiment of the present invention, respective sections of copper and aluminum expanded foil grid 20 (FIG. 2) were coated with a conductive composition of commercial grade conductive battery carbon black, such as MMM Super P, dispersed in a commercially-available aqueous suspension of a copolymer of polyethylene with acrylic acid, e.g., Morton International Adcote primer 50C12. The resulting current collector material comprised, as depicted in FIG. 3, the metal grid substrate 23 encompassed in about a 1–5 µm thick layer of conductive composition 34.

EXAMPLE 1

A typical coating composition was prepared by dispersing in a ball mill for about 1 h at room temperature about 5 parts by weight of carbon black, about 100 parts of about a 12% copolymer suspension, and about 100 parts of ethanol. The dispersion was then thinned with about an equal part of ethanol to provide a convenient viscosity for dip- or spray-coating the grid substrate which ensured retention of the open areas 25 in the grid. Prior to spraying portions of grid substrates with the coating composition, oils and oxides were removed from the foil surfaces with an acetone rinse and, for the aluminum grid, about a 50 s dip in a 1N aqueous solution of KOH or NaOH, followed by water and acetone rinses and drying. The conductive coating composition was then applied, and the coated grid material was dried in air at room temperature. The amount of carbon has been found to be useful in a range of about 5–50% by weight of the dried coating, preferably about 30%.

As a measure of the improvement in the resistance achieved by this treatment according to the invention, pairs of 160 mm$^2$ sections of treated and untreated copper grid were laminated to respective portions of about 180 µm thick films of the above coke electrode composition to form simple test cells. These cells were then tested for transverse electrical resistance at various stages representative of the processing of an actual battery cell. As initially prepared, the comparative resistances of the treated:untreated collector cells were 0.26Ω:0.6Ω. After methanol extraction of the DBP plasticizer, the cells tested at 0.15Ω:0.5Ω. Finally, after the cells were immersed in 1M LiPF$_6$/EC/DMC electrolyte solution to substantially saturate the electrode composition, the tests indicated resistances of 0.20Ω:6.0Ω. Similar test cells were prepared of aluminum grid and films of LiMn$_2$O$_4$ electrode composition. The staged resistance tests of the treated: untreated cells yielded results of 1.0Ω:1.57Ω, 0.72Ω:0.65Ω, and 0.83Ω:14.0Ω.

EXAMPLE 2

Figure 4:
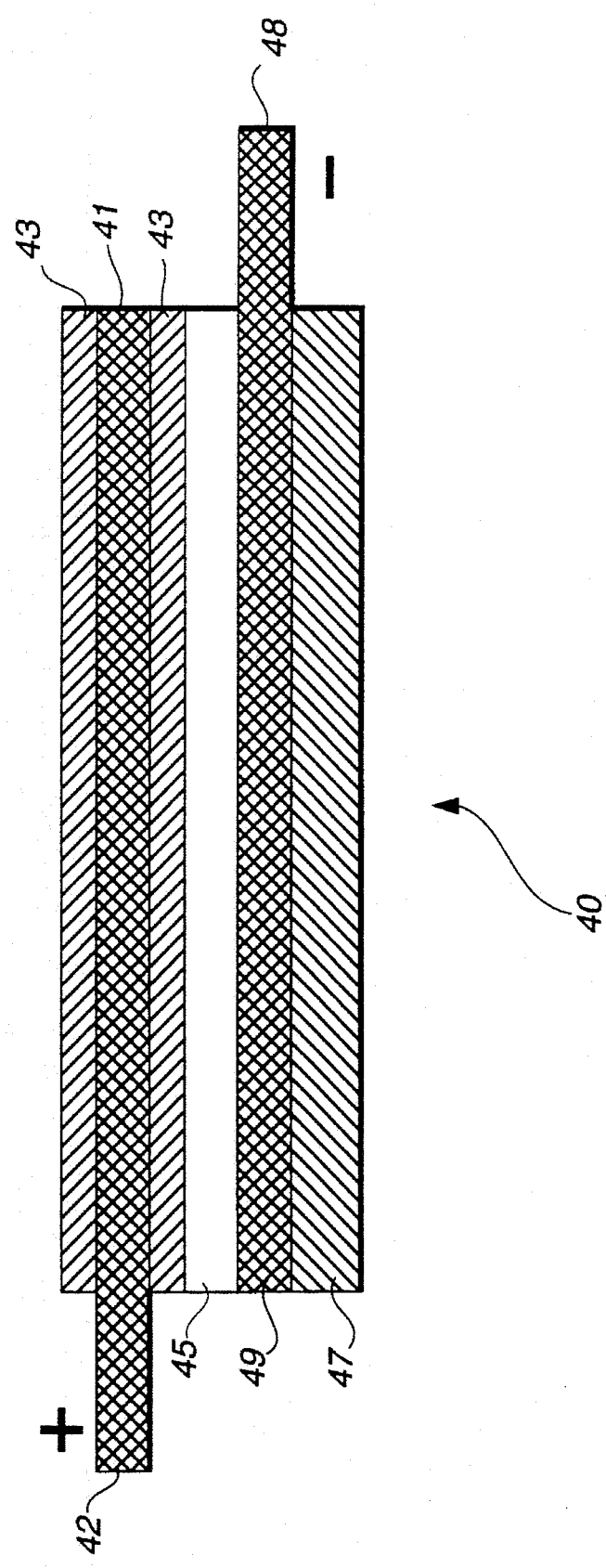
FIG. 4 is a representation, in elevational section, of a typical polymeric laminated battery structure showing variations in disposition of the coated collector member within the structure.

The coated collector grid materials of Example 1 were assembled with previously-described electrode and separator members 13, 14, 15 to fabricate battery cell laminates, such as depicted at 10 and 40 (FIG. 4). Due to the high level of electrical conductivity exhibited by the coated collector members, they may be respectively situated at any desired location in the cell structure. For example, each collector member may be overlaid upon its respective electrode film or layer, as shown in FIG. 1, to be laminated with and, if in grid form, embedded to any desired depth in its associated electrode upon the application of fabrication heat and pressure. Alternatively, as depicted in FIG. 4, to achieve further improvement in the reduction of internal cell resistance a coated grid collector member 41 may be laminated between sections of electrode material 43 in order to be situated wholly within the electrode, or a grid collector member 49 may be assembled at the interface between its associated electrode 47 and separator member 45. In such latter embodiments, it is convenient to allow for an extended collector grid tab, as at 42 or 48, in order to provide an accessible cell terminal.

After lamination, a completed battery cell as represented in FIG. 1 was processed as described in the noted patents by immersion in methanol to extract substantially all the DBP plasticizer from the electrode and separator matrix compositions. Ready access of the extracting solvent to these members is ensured by the retained grid openings in at least one of the collector members. Subsequent activation of the cell, in the described manner, by immersion in an electrolyte solution of 1M LiPF$_6$ in an equipart mixture of ethylene carbonate (EC) and dimethyl carbonate (DMC) prepared the cell for charge/discharge cycling. The cell exhibited remarkably good internal resistance of about 50–150 mΩ/Ah capacity.

EXAMPLE 3

In a comparative example to quantify the efficacy of the collector coating compositions of the invention, a similar cell was prepared in the manner described in U.S. Pat. No. 5,470,357, that is, the collector grid elements were pretreated with a thin, post-heated prime coat of the PVdF:HFP electrode matrix polymer to enhance lamination adhesion between the electrode and collector members. After extraction and activation with electrolyte solution, the cell exhibited an internal resistance of about 600–2000 mΩ/Ah capacity. Apparently, the normally employed solvents and electrolyte solutions whose functionality depends upon their swelling and penetrating the electrode and separator copolymer matrices also penetrated the collector element primer coatings and degraded the electrical continuity between the electrodes and the collector foil surfaces and contributed to the increased internal resistance. These results indicate the advantage achieved from the use of the preferred collector coating composition polymers which are substantially inert to the cell-processing solvents.

Figure 5:
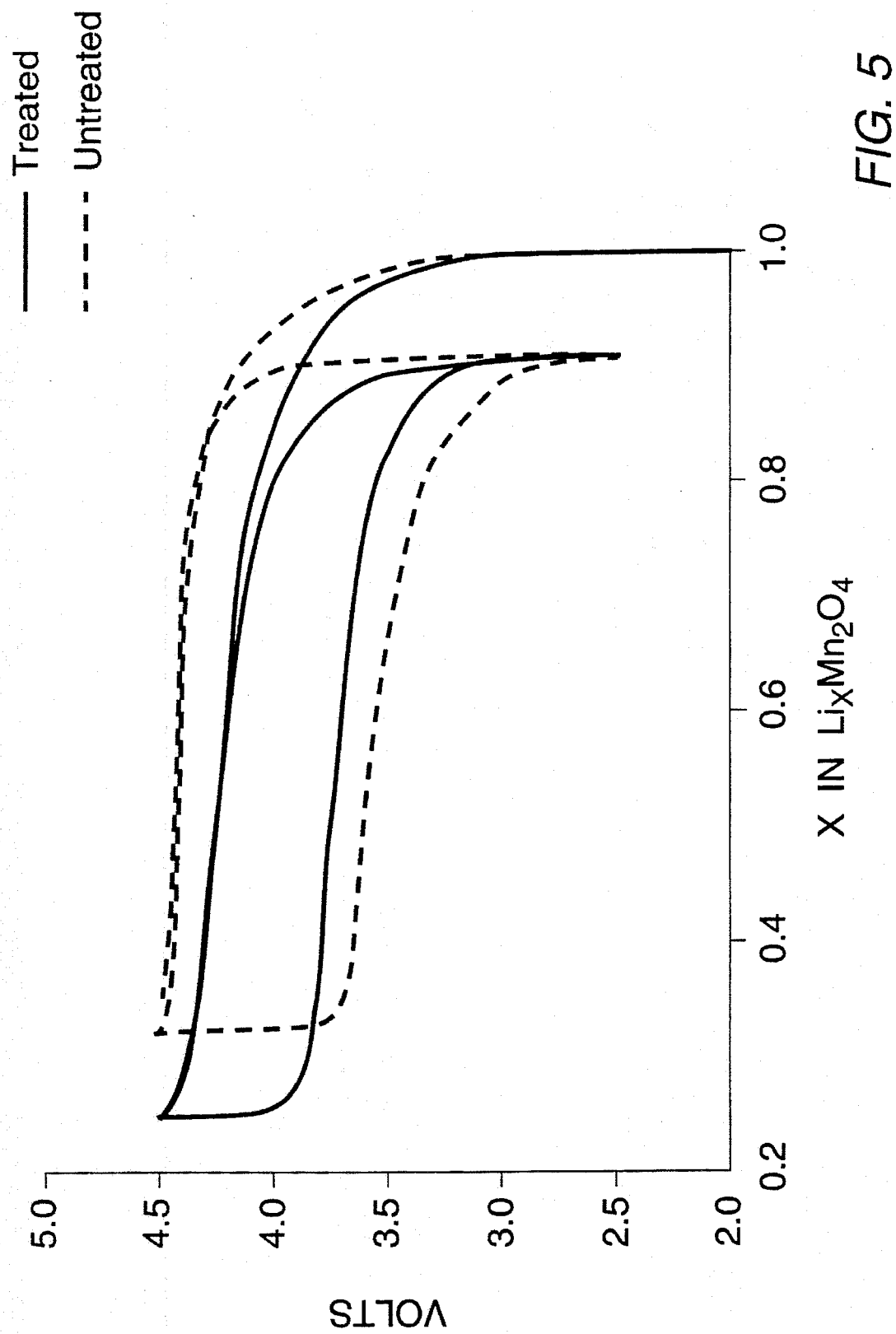
FIG. 5 presents comparative charge/discharge cycle traces of Li-ion cells comprising collector members with and without treatment according to the present invention.

Further indicative of the efficacy of the collector element treatment of the present invention are the comparative cycling traces of FIG. 5 which evidence the lesser degree of available charging, represented by less deintercalation of lithium ions, in the untreated sample prior to charging current cut-off at 4.5 V, as well as the lower level of productive voltage output under the same constant current load.

It is anticipated that numerous other implementations of the described manner of effecting improved internal cell resistance will occur to the skilled artisan, and such variants are nonetheless intended to be within the scope of the present invention as defined in the appended claims.

What is claimed is:

1. A method of making a low internal resistance battery comprising positive and negative electrode members having a separator member disposed therebetween and respective current collector members in contact therewith characterized in that said collector members comprise metallic current collector elements and, prior to said collector members being placed in contact with said electrode members,
a) the surfaces of said collector elements are cleaned of insulative materials; and
b) said cleaned collector elements are coated with an adherent electrically-conductive polymeric composition.

2. A method according to claim 1 wherein said conductive composition comprises an electrically-conductive material dispersed throughout a polymer matrix.

3. A method according to claim 2 which further comprises contacting said battery with a solution of an electrolyte in an organic solvent and wherein said coated composition matrix comprises a polymer which is substantially inert to said solvent.

4. A method of making a rechargeable battery which comprises arranging positive and negative electrode body members with a separator member disposed therebetween, each of said electrode and separator members comprising a flexible, polymeric film composition including a compatible plasticizer therefor; arranging respective flexible electrically-conductive current collector members in contact with said electrode members; and bonding each said member to contiguous members to form a unitary flexible laminate battery structure characterized in that said collector members comprise metallic current collector elements and prior to arranging said collector members,
a) the surfaces of said collector elements are cleaned of insulative materials; and
b) said cleaned collector elements are coated with an adherent electrically-conductive polymeric composition.

5. A method according to claim 4 wherein said conductive composition comprises an electrically-conductive material dispersed throughout a polymer matrix.

6. A method according to claim 5 wherein at least one of said collector elements is an open-mesh grid and said conductive composition is coated on said element in such a manner as to maintain an open-mesh structure in the resulting collector member.

7. A method according to claim 6 which further comprises extracting at least a portion of said plasticizer with a solvent therefor and wherein said matrix polymer is substantially inert to said solvent.

8. A method according to claim 7 which further comprises contacting the extracted battery structure with an electrolyte solution and wherein said matrix polymer is substantially inert to said solution.

9. A method according to claim 6 wherein said at least one collector member is at least partially embedded in the outermost surface of its respective electrode member.

10. A method according to claim 6 wherein said at least one collector member is situated within the body of its respective electrode member.

11. A method according to claim 6 wherein said at least one collector member is situated at the interface between its respective electrode member and said separator member.

12. A low internal resistance rechargeable battery comprising positive and negative electrode body members with a separator member disposed therebetween, each of said electrode and separator members comprising a flexible, polymeric film composition, and respective flexible electrically-conductive current collector members in contact with said electrode members, each said member being bonded to contiguous members to form a unitary flexible laminate battery structure characterized in that
a) said collector members comprise metallic current collector elements the surfaces of which have been cleaned of insulative materials; and
b) said cleaned collector elements are coated with an adherent electrically-conductive polymeric composition.

13. A battery according to claim 12 wherein said conductive composition comprises an electrically-conductive material dispersed throughout a polymer matrix.

14. A battery according to claim 13 which further comprises a solution of an electrolyte in an organic solvent and wherein said coated composition matrix comprises a polymer which is substantially inert to said solvent.

15. A battery according to claim 13 wherein at least one of said collector elements is an open-mesh grid and said conductive composition is coated on said element in such a manner as to maintain an open-mesh structure in the resulting collector member.

16. A battery according to claim 15 wherein said at least one collector member is at least partially embedded in the outermost surface of its respective electrode member.

17. A battery according to claim 15 wherein said at least one collector member is situated within the body of its respective electrode member.

18. A battery according to claim 15 wherein said at least one collector member is situated at the interface between its respective electrode member and said separator member.

* * * * *